United States Patent
Yu et al.

(10) Patent No.: US 10,365,893 B2
(45) Date of Patent: Jul. 30, 2019

(54) SAMPLE-BASED MULTIDIMENSIONAL DATA CLONING

(71) Applicant: Futurewei Technologies, Inc., Plano, TX (US)

(72) Inventors: Jiangsheng Yu, San Jose, CA (US); Shijun Ma, Milpitas, CA (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 15/474,801

(22) Filed: Mar. 30, 2017

(65) Prior Publication Data
US 2018/0285077 A1   Oct. 4, 2018

(51) Int. Cl.
G06F 7/58       (2006.01)
G06F 11/00      (2006.01)

(52) U.S. Cl.
CPC .......... *G06F 7/58* (2013.01); *G06F 11/00* (2013.01)

(58) Field of Classification Search
None
See application file for complete search history.

(56) References Cited

U.S. PATENT DOCUMENTS

| | | | |
|---|---|---|---|
| 5,124,932 A | 6/1992 | Lodder | |
| 6,757,700 B1* | 6/2004 | Druck | G06F 7/49947 708/204 |
| 8,166,039 B1 | 4/2012 | Haveliwala | |
| 2003/0182293 A1 | 9/2003 | Chambers et al. | |
| 2004/0044715 A1* | 3/2004 | Aldroubi | G06T 5/001 708/490 |
| 2007/0168409 A1* | 7/2007 | Cheung | G06F 17/30029 708/400 |
| 2008/0114564 A1 | 5/2008 | Ihara | |
| 2010/0274833 A1 | 10/2010 | Hirohata et al. | |
| 2014/0114609 A1 | 4/2014 | Maurer et al. | |
| 2017/0371936 A1 | 12/2017 | Yu et al. | |

FOREIGN PATENT DOCUMENTS

CN        106056254 A      10/2016

OTHER PUBLICATIONS

Notice of Allowance dated Apr. 11, 2018, in U.S. Appl. No. 15/448,233, 9 pages.
PCT/CN2018/080707, ISR, dated Jun. 19, 2018, 8 pages.

* cited by examiner

*Primary Examiner* — Michael D. Yaary
(74) *Attorney, Agent, or Firm* — Vierra Magen Marcus LLP

(57) ABSTRACT

The disclosure relates to technology for generating a data set comprising random numbers that are distributed by a multivariate population distribution. A set of empirical cumulative distribution functions are constructed from a collection of multidimensional random samples of the multivariate population, where each empirical cumulative distribution function is constructed from observations of a random variable. A number of multidimensional sample points are sampled from the collection of multidimensional random samples and the number of multidimensional sample points are each replaced with random neighbors to generate cloned data.

21 Claims, 8 Drawing Sheets

For samples 0, 3, 2, 1, 1, the ECDF is:

$$\hat{F}_5(x) = \begin{cases} 0 & when\ x < 0 \\ 0.2 & when\ 0 \le x < 1 \\ 0.6 & when\ 1 \le x < 2 \\ 0.8 & when\ 2 \le x < 3 \\ 1 & when\ x \ge 3 \end{cases}$$

524

Generating a second random number uniformly distributed over a third interval from the minimum to another one of the observed values

Generating a second random number uniformly distributed over a fourth interval from a non-maximum observed value to the maximum

Generating a second random number from a predetermined number of the minimum observed values

Generating a second random number from a predetermined number of the maximum observed values

FIG. 5G

SAMPLE-BASED MULTIDIMENSIONAL DATA CLONING

BACKGROUND

Data incorporating large quantities of variables is becoming increasingly commonplace, especially in data sets that are sufficiently large that they may be generated and/or stored by multiple computing devices. In addition to the challenges of handling such a large quantity of data, increasing the quantity of variables in a data set by even a small degree tends to add exponentially to at least the complexity of relationships among the data values, and may result in an exponential increase in data size.

Among such challenging data sets are large random samples generated by various forms of statistical analysis. Performance testing is essential for quality assurance of products and services across all industries. A reliable performance testing depends largely on proper testing data, which is not always accessible for testing purposes. Accordingly, developers and manufacturers are challenged with providing testing data for testing products and services where such testing data may not be obtainable. As a result, precision of the testing results is often inaccurate or misleading since the performance testing data was not available.

BRIEF SUMMARY

In a first embodiment, there is a computer-implemented method for generating a data set comprising random numbers that are distributed by a multivariate population distribution, comprising constructing a set of empirical cumulative distribution functions from a collection of multidimensional random samples of the multivariate population, where each empirical cumulative distribution function is constructed from observations of a random variable; sampling a number of multidimensional sample points from the collection of multidimensional random samples; and replacing each of the multidimensional sample points with random neighbors to generate cloned data.

In a second embodiment according to any one of the preceding embodiments, the computer-implemented method further comprising generating the random neighbors for elements of one or more of the multidimensional sample points.

In a third embodiment according to any one of the preceding embodiments, generating the random neighbors for each element of the one or more multidimensional sample points comprises sorting distinct observed values of the random variable in an increasing order; and generating the random neighbors for a corresponding one of the elements of any one of the multidimensional sample points when the corresponding element is one of between a minimum and a maximum of the observed values, the minimum of the observed values and the maximum of the observed values.

In a fourth embodiment according to any one of the preceding embodiments, generating the random neighbor for the corresponding element further comprises defining a left boundary of the corresponding element as the minimum of one or more nearest left neighbors; defining a right boundary of the corresponding element as the maximum of one or more nearest right neighbors; generating a first random number that is uniformly distributed over a first interval constructed by the left boundary and the right boundary; searching two adjacent observed values such that an empirical cumulative distribution function range for the adjacent observed values covers the first random number; defining a second interval by the two adjacent observed values; and generating the random neighbor when the corresponding random variable is continuous or discrete.

In a fifth embodiment according to any one of the preceding embodiments, generating the random neighbor for the element of the one or more multidimensional random sample points when the corresponding random variable is continuous comprises generating a second random number that is uniformly distributed over the second interval.

In a sixth embodiment according to any one of the preceding embodiments, generating the random neighbor for the element of the one or more multidimensional random sample points when the corresponding random variable is discrete comprises defining a second random number to be the right boundary of the second interval.

In a seventh embodiment according to any of the preceding embodiments, generating the random neighbor for the element of the one or more multidimensional random sample points, which is the minimum of the observed values, when the corresponding random variable is continuous, comprises generating a second random number that is uniformly distributed over a third interval from the minimum to another one of the observed values.

In an eighth embodiment according to any one of the preceding embodiments, generating the random neighbor for the element of the one or more multidimensional random sample points, which is the maximum of the observed values, when the corresponding random variable is continuous, comprises generating a second random number that is uniformly distributed over a fourth interval from a non-maximum observed value to the maximum.

In a ninth embodiment according to any one of the preceding embodiments, generating the random neighbor for the element of the one or more multidimensional random sample points, which is the minimum of the observed values, when the corresponding random variable is discrete, comprises generating a second random number from a predetermined number of the minimum observed values.

In a tenth embodiment according to any one of the preceding embodiments, generating the random neighbor for the element of the one or more multidimensional random sample points, which is the maximum of the observed values, when the corresponding random variable is discrete, comprises generating a second random number from a predetermined number of the maximum observed values.

In an eleventh embodiment according to any one of the preceding embodiments, replacing the number of sample points with random neighbors is performed by one or more processors in parallel.

In a twelfth embodiment, there is a device for generating a data set comprising random numbers for generating random numbers that are distributed by a multivariate population distribution, comprising a non-transitory memory storage comprising instructions; and one or more processors in communication with the memory, wherein the one or more processors execute the instructions to perform operations comprising constructing a set of empirical cumulative distribution functions from a collection of multidimensional random samples of the multivariate population, where each empirical cumulative distribution function is constructed from observations of a random variable; sampling a number of multidimensional sample points from the collection of multidimensional random samples; and replacing each of the multidimensional sample points with random neighbors to generate cloned data.

In a thirteenth embodiment, a non-transitory computer-readable medium storing computer instructions for generating a data set comprising random numbers that are distributed by a multivariate population distribution, that when executed by one or more processors, perform the steps of constructing a set of empirical cumulative distribution functions from a collection of multidimensional random samples of the multivariate population, where each empirical cumulative distribution function is constructed from observations of a random variable sampling a number of multidimensional sample points from the collection of multidimensional random samples; and replacing each of the multidimensional sample points with random neighbors to generate cloned data.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

BRIEF DESCRIPTION OF THE DRAWINGS

Aspects of the present disclosure are illustrated by way of example and are not limited by the accompanying figures for which like references indicate elements.

FIGS. 5A-5G illustrate flow diagrams in accordance with FIGS. 1-2, 4 and 6.

DETAILED DESCRIPTION

The disclosure relates to technology for generating random numbers that are distributed by a population distribution.

In statistics, traditional resampling methods such as bootstrapping or jackknifing, allow for the estimation of the precision of sample statistics (e.g., medians, variances, percentiles) using subsets of data or by drawing randomly with replacement from a set of data points. In such instances, no new sample points are generated. That is, only data points from otherwise available data may be sampled. Thus, data that is unavailable may not be used as part of the resampling methodology.

According to embodiments of the disclosure, the proposed methodology provides for the generation of random numbers that are characteristic of data points (samples) in the data that would otherwise not be available for consumption. That is, new random numbers may be generated that are not part of the set of observations. For example, assume a set of data that includes private or sensitive information for which a small portion of the data is available (e.g., names and addresses), but for which other portions of the data (e.g., medical history and social security number) remain unavailable. In one embodiment, the random number characteristic of the unavailable data points is created by constructing an empirical cumulative distribution function from a collection of multidimensional random samples of a multivariate population. A number of multidimensional sample points are sampled from the collection and replaced with random neighbors to generate cloned data.

It is understood that the present embodiments of the disclosure may be implemented in many different forms and that claims scopes should not be construed as being limited to the embodiments set forth herein. Rather, these embodiments are provided so that this disclosure will be thorough and complete and will fully convey the inventive embodiment concepts to those skilled in the art. Indeed, the disclosure is intended to cover alternatives, modifications and equivalents of these embodiments, which are included within the scope and spirit of the disclosure as defined by the appended claims. Furthermore, in the following detailed description of the present embodiments of the disclosure, numerous specific details are set forth in order to provide a thorough understanding. However, it will be clear to those of ordinary skill in the art that the present embodiments of the disclosure may be practiced without such specific details.

Figure 1:
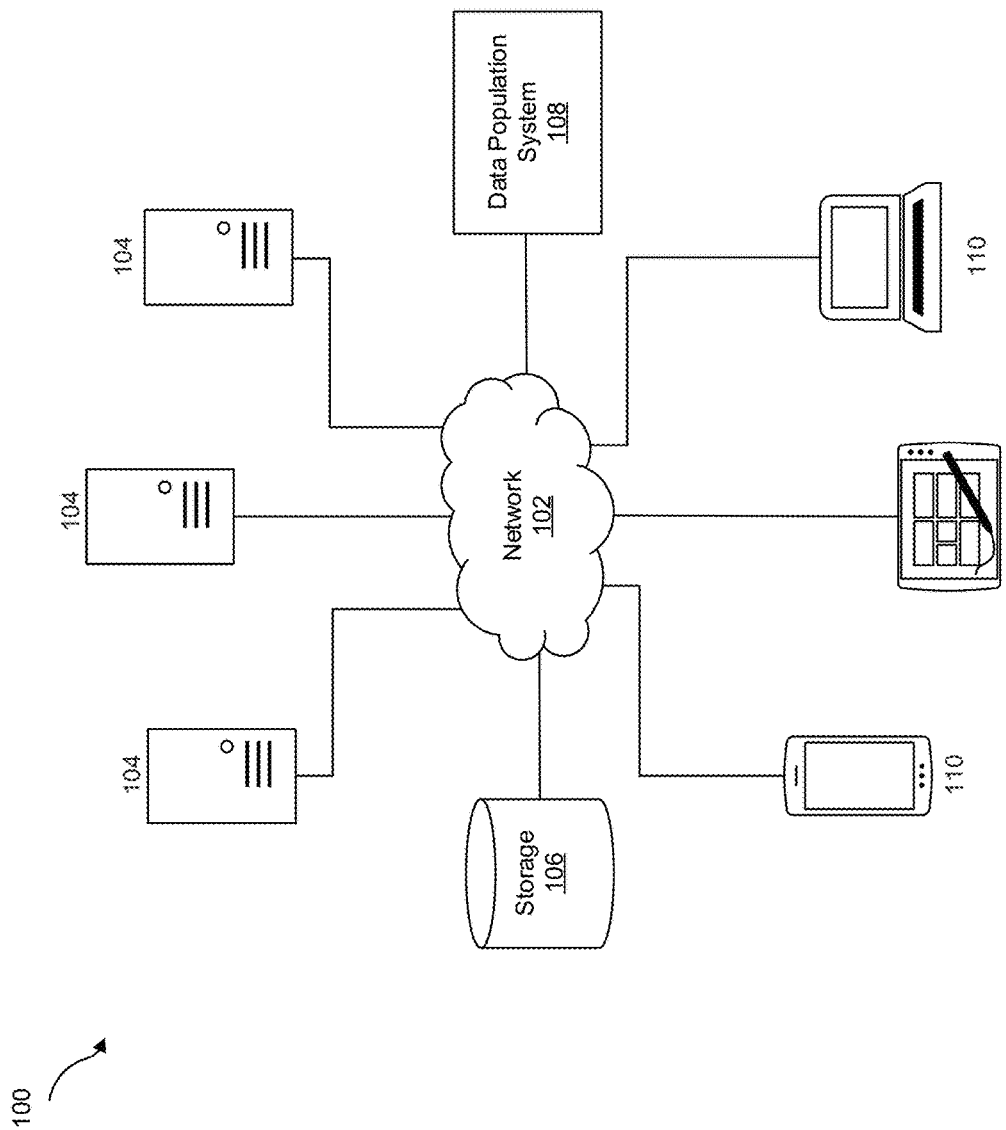
FIG. 1 illustrates an example of a distributed data processing system in which embodiments of the disclosure may be implemented.

FIG. 1 illustrates an example of a distributed data processing system in which embodiments of the disclosure may be implemented. Distributed data processing system 100 includes, but is not limited to, a network 102, servers 104, storage 106, data population system 108 and client devices 110.

The network 102 represents one or more of a cable, wireless, fiber optic, or remote connections via a telecommunication link, an infrared link, a radio frequency link, or any other connectors or systems that provide electronic communication. The network 102 may include an intranet, the Internet or any combination, and also include intermediate proxies, routers, switches, load balancers, and the like.

In the depicted example, a server 104 is connected to network 102 along with storage 106 and clients 110. In one embodiment, the server 104 provides data, such as boot files, operating system images, and applications to clients 110. Servers 106 may include any computing devices configured to respond to network requests received from client devices 110, and may include a web server, an application server, a file server, or a database server or the like.

Clients 110 may include, for example, a notebook computer, a desktop computer, a laptop computer, a handheld computing device, a mobile phone or a smartphone, a tablet computing device, a portable reading device, or any other processing device.

Data population system 108 is operable to generate sampling data, for example, based on provisioned data generating rules at the client 110, and is described in more detail below.

Storage 106 represents any device or combination of devices configured to store data for use by data population system 108. Such data may include database information, data schema, the data generating rules, data patterns and trends, and historical sampling data.

It is appreciated that the processes and methodologies described herein may be implemented in a client device or a server. For example, the processes described herein may be implemented in a server, such as server 104, that obtain data from various data sources connected via the network 102. In response to a request from a client device, such as client device 110, the server 104 collect the data for evaluation using the techniques described below.

Figure 2:
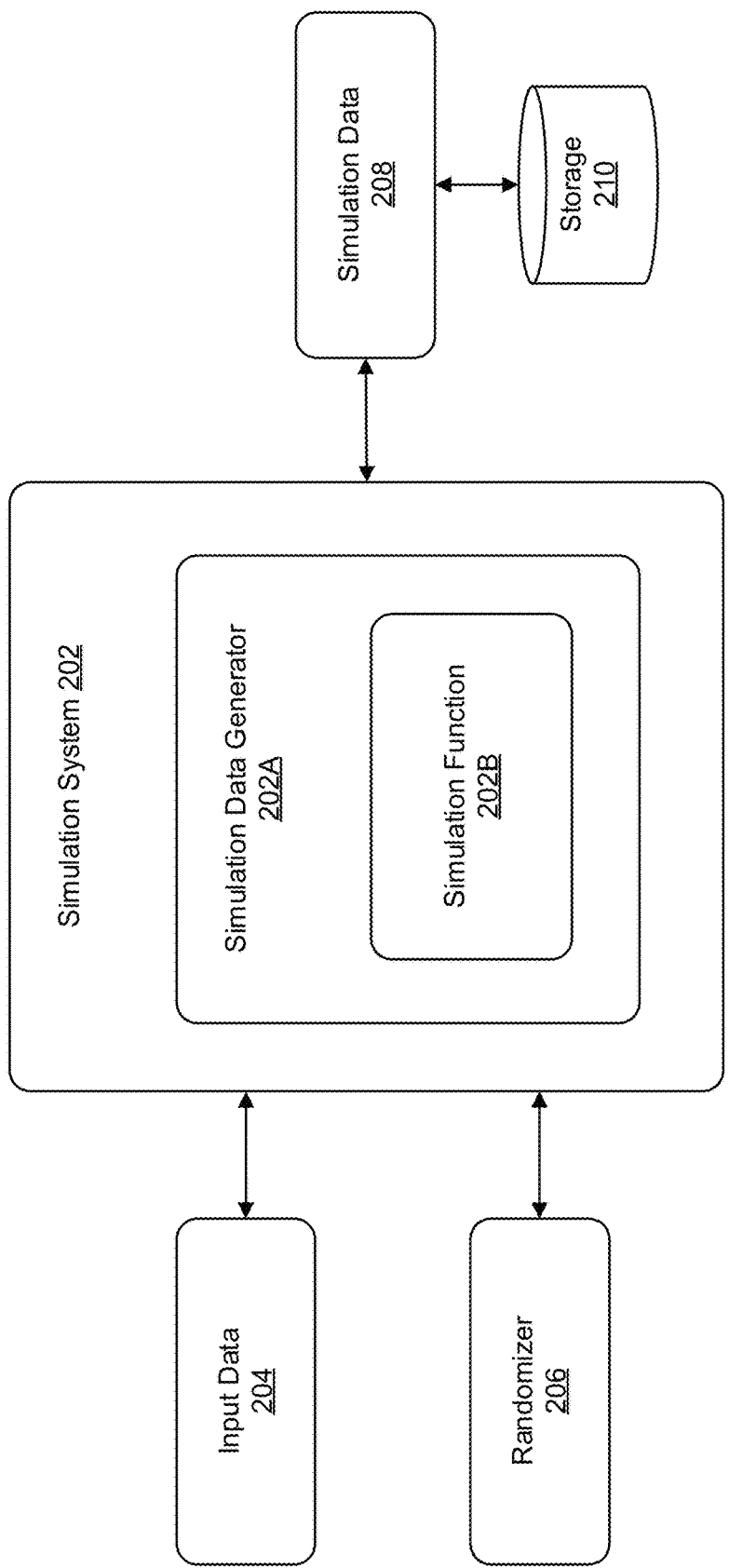
FIG. 2 illustrates an example simulation system implemented in the distributed data processing system of FIG. 1.

FIG. 2 illustrates an example simulation system implemented in the distributed data processing system of FIG. 1. The simulation system 202 may generate an approximate probability distribution for a statistical test, where the statistical test generates results of the statistical test using the approximate probability distribution. Simulations may be performed for any number of statistic tests. For example, statistical tests may include a median test, a Kolmogorov Smirnov test, a Friedman test, data mining decision tree tests, or the like. However, it is appreciated that any number of different statistical tests may be employed as well understood by the skilled artisan.

The simulation system 202 may be arranged to generate a cumulative distribution function (CDF) (or distribution function) for the statistics of a simulation test. A probability distribution may assign a probability to each measureable subset of possible outcomes of a random experiment of statistic inference and may be univariate or multivariate. A univariate distribution gives the probabilities of a single random variable taking on various alternative values, whereas a multivariate distribution gives probabilities of a random vector (e.g., a set of two or more random variables) taking on various combinations of values.

In particular, a statistical test is a hypothesis that is testable on the basis of observing a process that is modeled via a set of random variables. Typically, two statistical data sets are compared or a data set obtained by sampling is compared against a synthetic data set from an idealized model. A hypothesis is then proposed for the statistical relationship between the two data sets, and this is compared as an alternative to an idealized null hypothesis that proposes no relationship between two data sets. The comparison is deemed statistically significant if the relationship between the data sets would be an unlikely realization of the null hypothesis according to a threshold probability—the significance level.

In statistical testing, a test statistic is a function of associated data and a model. Under the assumptions of a null hypothesis and the model the test statistic has an associated "sampling distribution." A sampling distribution refers to a probability distribution for values of the test statistic over hypothetical repeated random samples of the data, for random data samples having the probability distribution assumed for the data by the model and null hypothesis.

In different embodiments, a probability distribution may be "known" or "unknown." A probability distribution of "known" refers to the analytical formula of the CDF of the distribution can be efficiently computed, for example, the CDF is a closed-form expression, or the CDF can be well approximated in a numerical method. On the other hand, a probability distribution of "unknown" refers to the analytical formula of the CDF of the distribution is unavailable, or cannot be efficiently computed or approximated by any known numerical method. Accordingly, the probability distribution of "unknown" is to be evaluated through simulation, as in the examples described herein.

In one embodiment, the statistics of simulation tests follow a probability distribution of the above-mentioned unknown form. In such cases, a probability distribution of unknown form may be approximated through empirical measure. An empirical measure is a random measure arising from a particular realization of a sequence of random variables that are typically finite. As such, the simulation system 202 may generate an approximate probability distribution for the statistics of a simulation test where the probability distribution for the statistics of the simulation test is unknown. Examples of an approximate probability distribution may include, but are not limited to, an empirical distribution function (or empirical CDF), which is an empirical CDF is a cumulative distribution function associated with an empirical measure of a statistic.

The simulation system 202 may be part of the data population system 108 (FIG. 1). As illustrated in the non-limiting embodiment, the simulation system 202 includes a simulation data generator 202A and simulation function 202B. The simulation system 202 is also communicatively coupled to input data 204, randomizer 206 and simulation data 208, which is communicatively coupled to storage 210.

The simulation data generator 202A may generate simulation data 208 for a simulation test using the simulation function 202B. The simulation function 202B, which may be stored as part of a software library, may be any well-known distribution model, such as the empirical CDF.

The input data 204 may comprise definitions to generate simulation data 208, and the randomizer 206 may generate random numbers for deriving the simulation data 208. The input data 204 may also include data generation parameters, such as statistical information including minimum, maximum, mean, variance, number of distinct values, etc., useful for the simulation system 202 to produce simulation data 208. For example, the input data 204 may provide information about a computing environment in which the simulation system 202 will run, a database to store the simulation data 208, data structures for the simulation data 208 and other information related to generating simulation data 208.

In one embodiment, the simulation data generator 202A may utilize the simulation function 202B, the input data 204 and/or the randomizer 206 to generate the simulation data 208. The simulation data generator 202A may also store the simulation data 208 in a storage 210. For example, the simulation data 208 may be stored in the storage 210 in accordance with definitions provided by the input data 204.

Storage 210 may be any storage, storage system, data source, database, or the like.

Figure 3A:
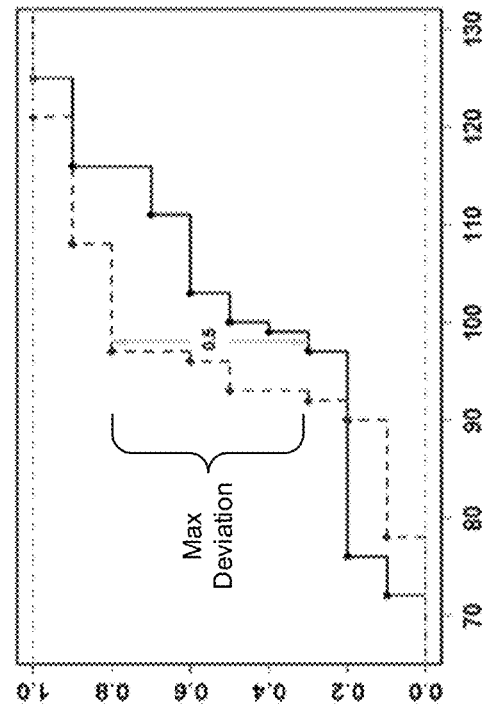
FIG. 3A illustrates an empirical cumulative distribution function according to one example embodiment.
Figure 3B:
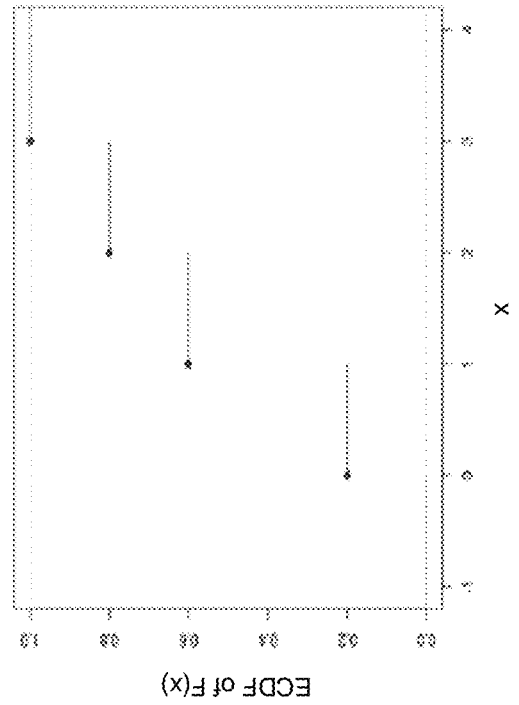
FIG. 3B illustrates a Kolmogorov distance between two distribution functions as calculated in FIG. 3A.

FIG. 3A illustrates an empirical cumulative distribution function according to one example embodiment. FIG. 3B illustrates a Kolmogorov distance between two distribution functions as calculated in FIG. 3A.

In probability distribution, the probability of an occurrence of different possible outcomes is predicted. Probability distributions are generally divided into two classes—discrete probability distribution and continuous probability distribution. Algorithms, many of which are based on a pseudorandom number generator that produces numbers X, are uniformly distributed in an interval [0,1]. These random variables X are then transformed via an algorithm to create a new random variable, as described below, having the required probability distribution.

In one embodiment, in which a univariate random variable is assigned a number to each outcome of a random experiment, an empirical cumulative distribution function (ECDF) is constructed from random samples of a population. Given a sequence of samples $X_1, X_2, \ldots, X_n \sim F(x)$, where the distribution function $F(x)$ is unknown, the empirical cumulative distribution function of the samples may be used to generate a random number (i.e., a new random number) from $F(x)$. In one embodiment, the newly generate random number is characteristic of data in the population that is otherwise not available for sampling. The empirical cumulative distribution function is defined by the following non-decreasing step function over R with values in the interval [0,1]:

$$\hat{F}_n(x) = \frac{1}{n} \#\{X_i \leq x : x \in \mathbb{R}, \quad i = 1, 2, \ldots, n\},$$

where $\#\{X_i \leq x: I=1, 2, \ldots, n\}$ denotes the number $X_i$'s that are no bigger than x, and R is the set of all real numbers.

The random variables may be a continuous random variable, in which the variable may take on infinitely many values, or a discrete random variable, in which the variable may only take on specified values. Taking simplistic examples for purposes of discussion, if X is uniformly distributed over the interval [0,1], then the distribution function of X is given by:

$$F(x) = \begin{cases} 0 : x < 0 \\ x : 0 \leq x < 1 \\ 1 : x > 1 \end{cases}$$

If X takes on discrete values 0 and 1, with equal probability, then the distribution function of X is given by:

$$F(x) = \begin{cases} 0 : x < 0 \\ 1/2 : 0 \leq x < 1 \\ 1 : x > 1 \end{cases}$$

In order to evaluate the performance of random numbers generated by the empirical distribution function, the Kolmogorov distance (K-distance) is applied to quantify a distance between two distribution functions—e.g., F(x) and G(x). For example, with reference to FIG. 3B, F(x) is represented by the solid line and G(x) is represented by the dashed line.

The K-distance between the two distribution functions F(x) and G(x) is the maximum vertical deviation (max deviation) between them, such that:

$$\sum_{x \in R} |F(x) - G(x)|$$

Applying a random sequence of samples 0, 3, 2, 1, 1 from a population, the empirical distribution function of the five samples is $$\hat{F}_5(x) = \begin{cases} 0 & \text{when } x < 0 \\ 0.2 & \text{when } 0 \leq x < 1 \\ 0.6 & \text{when } 1 \leq x < 2 \\ 0.8 & \text{when } 2 \leq x < 3 \\ 1 & \text{when } x \geq 3 \end{cases}$$

where the probability distribution function describes the likelihood that a variable x that has a uniform chance to take on any value in the interval [0,1] without any chance of having another value. The probability distribution function is illustrated with reference to FIGS. 3A and 3B.

For example, when the ECDF of F(x) is plotted against samples x over the interval x<0, the ECDF of F(x)=0; over the interval 0≤x<1, the ECDF of F(x)=0.2; over the interval 1≤x<2, the ECDF of F(x)=0.6; over the interval 2≤x<3, the ECDF of F(x)=0.8; and the interval x≥3, the ECDF of F(x)=1.

If a second distribution G(x) is plotted against samples x over the same interval, the K-distance between the first distribution F(x) and second distribution G(x) is measured, resulting in the example graph of FIG. 3B is generated. The K-distance uses the maximum vertical deviation between the two curves as the maximum deviation statistic D. In this case, the maximum deviation occurs near x=100 and has D=0.5. (The fraction of F(x) that is less than one is 0.2 and the fraction of G(x) that is less than one is 0.8. Thus the maximum difference in cumulative fraction is D=0.5.).

In the case of bivariate and multivariate random numbers, the joint distribution of a bivariate variable is known when all probabilities of the form below are known:

$$P(a < X \leq b, c < Y \leq d), \text{ with } a < b, c < d.$$

Similarly, the joint distribution of a multivariate variable $X_1, X_2, \ldots, X_m$ is known when all probabilities of the form below are known:

$$P(a_1 < X_1 \leq b_1, a_2 < X_2 \leq b_2, \ldots, a_m < X_1 \leq b_m), \text{ with } a_k < b_k, k=1, \ldots, m.$$

As in the univariate case described above, the joint probability distribution of any multivariate random variable can be achieved through its cumulative distribution function. Thus, a joint or bivariate cumulative distribution function of two random variables (X, Y) is defined as:

$$F(x, y) = P(X \leq x, Y \leq y),$$

and the joint or multivariate cumulative distribution function of multiple random variables $X_1, X_2, \ldots, X_m$ is defined as:

$$F(x_1, X_2, \ldots, x_n) = P(X_1 \leq x_1, X_2 \leq x_2, \ldots, X_n \leq x_n).$$

Figure 4A:
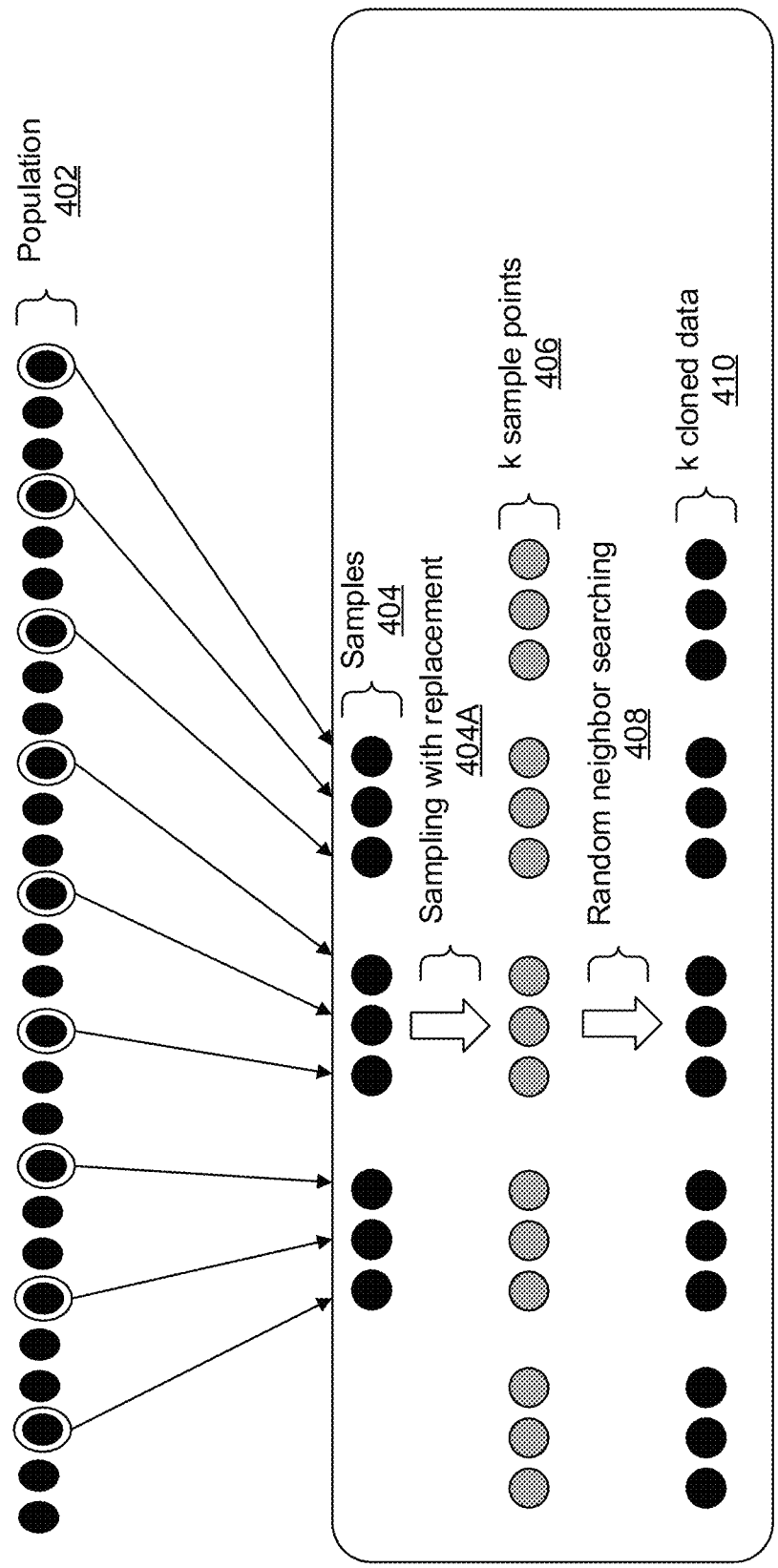
FIG. 4A illustrates an overall flow diagram for implementation in the environments depicted in FIGS. 1 and 2.

FIG. 4A illustrates an overall flow diagram for implementation in the environments depicted in FIGS. 1 and 2. The disclosed technology provides for the generation of random numbers that are characteristic of data points (samples) in the data (population) that would otherwise not be available for consumption. That is, new random numbers may be generated from the samples that are not otherwise part of the set of observations.

In the example of FIG. 4, there is a population 402 that comprises numerous data points (represented by blackened circles). These data points may be provided from a multitude of sources and typically include extremely large amounts of data, such as that provided by a data center for big data analytics. A sequence of multidimensional random samples (e.g., $X_1, X_2, \ldots, X_n \sim F(x)$) 404 may be drawn from the population 402, where the distribution function F(x) is unknown. Within the context of this document, the matrix is an n×d matrix with n representing a number of samples and d representing a number of dimensions. If $X_i$ is the $i^{th}$ sample, then $X_i = (X_i^{(1)}, X_i^{(2)}, \ldots, X_i^{(d)})^T$, where n samples are described by the following d-dimensional data matrix:

$$A = \begin{pmatrix} X_1^{(1)} & X_1^{(2)} & \ldots & X_1^{(d)} \\ X_2^{(1)} & X_2^{(2)} & & X_2^{(d)} \\ \vdots & & \ddots & \vdots \\ X_n^{(1)} & X_n^{(2)} & \ldots & X_n^{(d)} \end{pmatrix} n \times d.$$

Each column in the data matrix includes a set of observations of random variables $X^{(j)}$, where j=1, 2, ..., d and j represents the number of columns.

If $\hat{F}_n^{(j)}$ is the empirical cumulative distribution function of the random variable $X^{(j)}$, constructed from the observations $X_1^{(j)}, X_2^{(j)}, \ldots, X_n^{(j)}$, where $j=1, 2, \ldots, d$, then the empirical cumulative distribution function for each column in the above data matrix is constructed.

In one embodiment, k sample points 406 are extracted by applying sampling with replacement 404A and random neighbors of the k samples 406 are searched at 408. In order to generate the multidimensional random numbers (k cloned data) 410, and given samples $X_1, X_2, \ldots, X_n$ with replacement 404A, k sample points 406 are extracted, as noted above. From these k sample points 406, the random neighbors 408 are determined using the algorithm expressed below. If $X=(X^{(1)}, X^{(2)}, \ldots, X^{(d)})^T$ are the k sample points 406, the algorithm finds random neighbors 408 for $X^{(1)}$, $X^{(2)}, \ldots, X^{(d)}$.

| sample | ECDFs | neighbor |
|---|---|---|
| $X^{(1)}$ → | $\hat{F}_n^{(1)}(x)$ → | $x^{*(1)}$ |
| . | . | . |
| . | . | . |
| $X^{(j)}$ → | $\hat{F}_n^{(j)}(x)$ → | $x^{*(j)}$ |
| . | . | . |
| . | . | . |
| $X^{(d)}$ → | $\hat{F}_n^{(d)}(x)$ → | $x^{*(d)}$ |

In one example, without loss of generality, we assume there are $m \geq 3$ distinct values in the samples $X_1^{(j)}$, $X_2^{(j)}, \ldots, X_n^{(j)}$, denoted by $x_1 < x_2 < \ldots < x_m$. When $X^{(j)}$ is a discrete random variable, then $X^{(j)}$ may be expressed as:

$$X^{(j)} \sim p_1 < x_1 > + \ldots + p_m < x_m >,$$

where $p_1 = \hat{F}_n^{(j)}(x_1)$, $p_z = \hat{F}_n^{(j)}(p_z) - \hat{F}_n^{(j)}(p_{z-1})$ for $z=2, \ldots, m$.

In particular, a random neighbor of $X^{(j)} = x_i$ is searched in the interval $[x_{i-t}, x_{i+t}]$, which is called the window of $x_i$ with size t (illustrated in FIG. 6 below). For purposes of discussion, $x_{i-t}, x_{i+t}$ may also be denoted by $x_i^{left}, x_i^{right}$. In one embodiment, the indices of $x_i^{left}, x_i^{right}$ are symmetric about and may be expressed as:

$$x_i^{left} = x_1, \text{ if } i-t \leq 1 \text{ and } X_i^{right} = x_m, \text{ if } i+t \geq m.$$

For purposes of illustration, we assume I=2, t=2 for which $x_i^{left} = x_1$ and $X_1^{right} = x_3$. Random neighbors may be generated as follows:

1. If $1 < i < m$, generate a random number $y^{*(j)}$ from $U[\hat{F}_n^{(j)}(x_i^{left}), \hat{F}_n(x_i^{right}))$, where U[a,b] denotes the uniform distribution over the interval [a,b].
   (a) Searching the index $I \in \{i-t, \ldots, i, i+t\}$ such that $y^{*(j)} \in [\hat{F}_n^{(j)}(x_I), \hat{F}_n^{(j)}(x_{I+1}))$
   (b) Generating a random number $x^{*(j)}$ from $U[x_I, x_{I+1}]$ if $X^{(j)}$ is continuous, or let $x^{*(j)} = x_{I+1}$ if $X^{(j)}$ is discrete.
2. If i=1 or i=m, then

| X(j) | $x_1$ | $x_m$ |
|---|---|---|
| Continuous | $x^{*(j)} \sim U[x_1, x_{t+1})$ | $x^{*(j)} \sim U[x_{m-t}, x_m)$ |
| Discrete | $x^{*(j)} \sim \frac{p_1}{s}<x_1> + \ldots + \frac{p_t}{s}<x_t>$ | $x^{*(j)} \sim \frac{p_{m-t+1}}{s}<x_{m-t+1}> + \ldots + \frac{p_m}{s}<x_m>$ |
| | where $s = p_1 + \ldots + p_t$ | where $s = p\, x_{m-t+1} + \ldots + p_m$ |

Figure 4B:
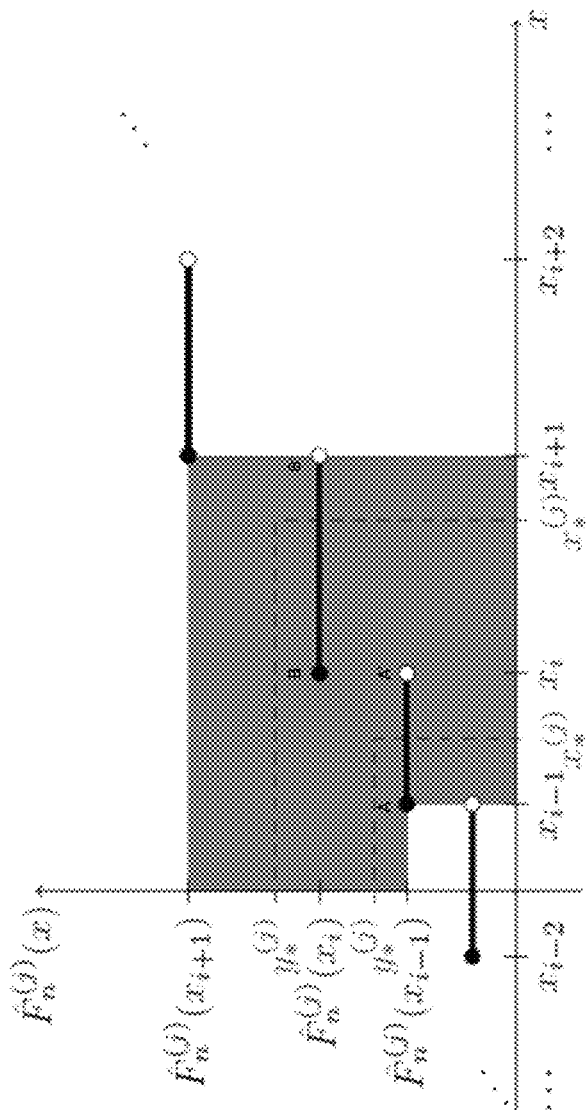
FIG. 4B illustrates generation of a random neighbor of a sample in accordance with FIG. 4A.

FIG. 4B illustrates generation of a random neighbor of a sample in accordance with FIG. 4A. The diagram illustrates generation of the random neighbors of samples $x_{i-1}$, $x_i$ and $x_{i+1}$ of the population. In the example, intervals such as $[x_{i-1}, x_i]$ and $[x_i, x_{i+1}]$ are depicted as a solid black lines, for example, between points (A and A') and (B and B'), where $x_{i-1}$, $x_i$ and $x_{i+1}$ represent samples of the population. Applying the above algorithm for determining random neighbors, and with reference to the diagram, $x^{*(j)}$ is the random neighbor of continuous variable $X^{(j)}$ and $(x^{*(1)}, x^{*(2)}, \ldots, x^{*(d)})^T$ is the random neighbor of $X=(X^{(1)}, X^{(2)}, \ldots, X^{(d)})^T$, which is for example a perturbation of X, in which the random variable $X^{(j)}$ is continuous and the window size is 1. It is appreciated that the window size is not limited to a size of 1, but rather is used for purposes of discussion.

FIGS. 5A-5G illustrate flow diagrams in accordance with FIGS. 1-2, 4, 6 and 7. It is appreciated that the processes and methodologies described herein may be implemented in a client device or a server. For example, the processes described herein may be implemented in a server, such as server 104, that obtain data from various data sources connected via the network 102. In response to a request from a client device, such as client device 110, the server 104 collects data for evaluation from a population.

Figures 5A, 5B, 5C:
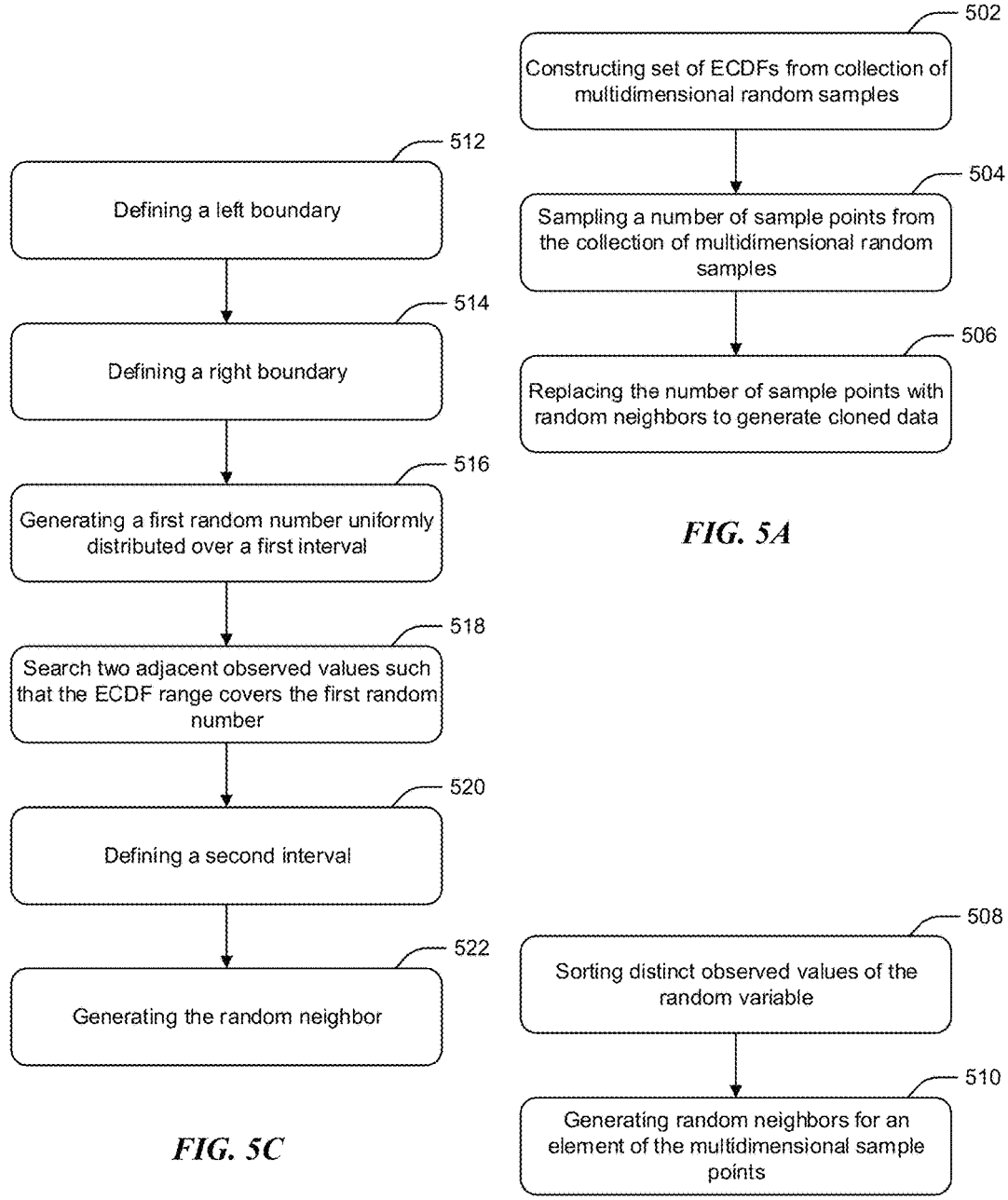

FIG. 5A illustrates a flow diagram for the overall process of generating cloned data from multidimensional random samples. At 502, server 104 constructs a set of empirical cumulative distribution functions (ECDFs) $\hat{F}_n^{\{(1)\}}(x)$, $\hat{F}_n^{\{(2)\}}(x), \ldots, \hat{F}_n^{\{(d)\}}(x)$ from a collection of multidimensional random samples $\vec{S}_1, \vec{S}_2, \ldots, \vec{S}_n$ of the multivariate population. Each empirical cumulative distribution function $\hat{F}_n^{\{(j)\}}(x)$ is constructed from observations of a set of random variables $X_j$, $j=1, 2, \ldots, d$.

At 504, the server 104 samples a number (k) of multidimensional sample points, in one embodiment with replacement, from the collection of multidimensional random samples $\vec{S}_1, \vec{S}_2, \ldots, \vec{S}_n$, and the number of multidimensional sample points are replaced with random neighbors $x^{*(j)}$ to generate cloned data such that the cloned data is employed during a testing process at 506.

FIG. 5B illustrates a flow diagram of generating random neighbors from observed values. At 508, generating the random neighbors for each element of any one of the multidimensional sample points $(X_i^{(1)}, X_i^{(2)}, \ldots, X_1^{(d)})$ includes sorting distinct observed values $(X_1^{(1)}, X_2^{(1)}, \ldots, X_n^{(1)})$ of the random variable $X^{(j)}$ in an increasing order, where $j=1, 2, \ldots, d$. Once sorted, at 510, the random neighbors $x^{*(j)}$ are generated for a corresponding one of the elements of any one of the multidimensional sample points $(X_i^{(1)}, X_i^{(2)}, \ldots, X_i^{(d)})$ when the corresponding element is one of between a minimum $(x_1, x_2, \ldots, x_t)$ and a maximum $(x_{m-t+1}, \ldots, x_m)$ of the observed values sorted by $x_1 < x_2 < \ldots < x_m$, the minimum of the observed values and the maximum of the observed values.

FIG. 5C illustrates a flow diagram of generating a random neighbor between minimum and maximum values. The flow diagram is also explained with reference to the notations found in FIG. 4B.

At 512, server 104 defines a left boundary of the corresponding element as the minimum of one or more nearest left neighbors $x_i^{left} = X_{min\{i-t,1\}}$ and defines a right boundary of the corresponding element as the maximum of one or more nearest right neighbors $X_i^{right} = X_{max\{i+t,m\}}$ at 514. 514.

At 516, a first random number $y^{*(j)}$ is generates such that it is uniformly distributed over a first interval $[\hat{F}_n^{\{(j)\}}(x_i^{left}), \hat{F}_n^{\{(j)\}}(x_i^{right}))$ constructed by the left boundary and the right boundary.

The two adjacent observed values (i.e., the index l∈{i−t, ..., i, ..., i+t}) are then searched at 518 such that their empirical cumulative distribution function range covers the first random number $y*^{(j)}$.

At 520, the server 104 defines a second interval $[x_l, x_{l+1})$ by the two adjacent observed values, and at 522 generates the random neighbor of $x_i$ when the corresponding random variable $X_j$ is continuous or discrete.

FIGS. 5D-5E illustrate flow diagrams in which the random variable is continuous. FIGS. 5F-5G illustrate flow diagrams in which the random variable is discrete.

At 524, the server 104 generates a second random number $x*^{(j)}$ that is uniformly distributed over a third interval $[x_1, x_{t+1})$ from the minimum observed value to another one of the observed values when the random variable is continuous.

At 526, the server 104 generates a second random number $x*^{(j)}$ that is uniformly distributed over a fourth interval $(x_{m-t}, x_m]$ from a non-maximum observed value to the maximum value when the random variable is continuous.

At 528, server 204 generates a second random $x*^{(j)}$ from a predetermined number of the minimum observed values (over the set of $x_1, ..., x_t$) when the random variable is discrete.

At 530, generates a second random number $x*^{(j)}$ from a predetermined number of the maximum observed values (set of $\{x_{m-t+i}, ..., x_m\}$) when the random variable is discrete.

Figure 6:
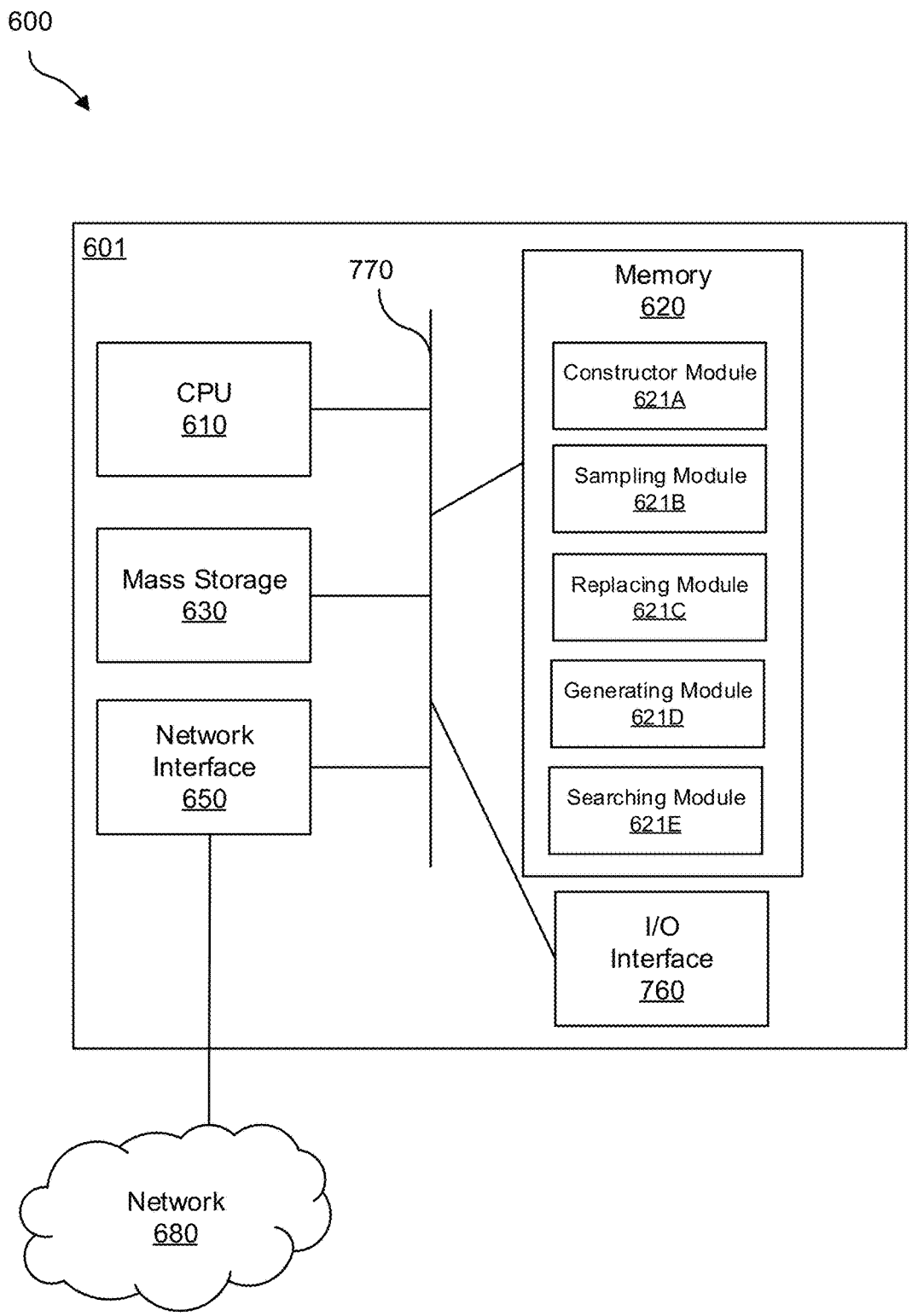
FIG. 6 illustrates a block diagram of a network system that can be used to implement various embodiments.

FIG. 6 is a block diagram of a network device that can be used to implement various embodiments. Specific network devices may utilize all of the components shown, or only a subset of the components, and levels of integration may vary from device to device. Furthermore, the network device 600 may contain multiple instances of a component, such as multiple processing units, processors, memories, transmitters, receivers, etc. The network device 600 may comprise a processing unit 601 equipped with one or more input/output devices, such as network interfaces, storage interfaces, and the like. The processing unit 601 may include a central processing unit (CPU) 610, a memory 620, a mass storage device 630, and an I/O interface 660 connected to a bus 670. The bus 670 may be one or more of any type of several bus architectures including a memory bus or memory controller, a peripheral bus or the like.

The CPU 610 may comprise any type of electronic data processor. The memory 620 may comprise any type of system memory such as static random access memory (SRAM), dynamic random access memory (DRAM), synchronous DRAM (SDRAM), read-only memory (ROM), a combination thereof, or the like. In an embodiment, the memory 620 may include ROM for use at boot-up, and DRAM for program and data storage for use while executing programs. In embodiments, the memory 620 is non-transitory. In one embodiment, the memory 620 includes constructor module 621A that constructs a set of empirical cumulative distribution functions from a collection of multidimensional random samples of the multivariate population, a sampling module 621B that samples a number of multidimensional sample points from the collection of multidimensional ransom samples, a replacing module 621C that replaces the number of multidimensional sample points with random neighbors to generate cloned data. A generator module 621D generates ransom neighbors for elements of any one of the multidimensional sample points, and a searching module 621E searches two adjacent observed values such that their empirical cumulative distribution function range covers the random number.

The mass storage device 630 may comprise any type of storage device configured to store data, programs, and other information and to make the data, programs, and other information accessible via the bus 670. The mass storage device 630 may comprise, for example, one or more of a solid state drive, hard disk drive, a magnetic disk drive, an optical disk drive, or the like.

The processing unit 601 also includes one or more network interfaces 650, which may comprise wired links, such as an Ethernet cable or the like, and/or wireless links to access nodes or one or more networks 680. The network interface 650 allows the processing unit 601 to communicate with remote units via the networks 680. For example, the network interface 650 may provide wireless communication via one or more transmitters/transmit antennas and one or more receivers/receive antennas. In an embodiment, the processing unit 601 is coupled to a local-area network or a wide-area network for data processing and communications with remote devices, such as other processing units, the Internet, remote storage facilities, or the like.

It is understood that the present subject matter may be embodied in many different forms and should not be construed as being limited to the embodiments set forth herein. Rather, these embodiments are provided so that this subject matter will be thorough and complete and will fully convey the disclosure to those skilled in the art. Indeed, the subject matter is intended to cover alternatives, modifications and equivalents of these embodiments, which are included within the scope and spirit of the subject matter as defined by the appended claims. Furthermore, in the following detailed description of the present subject matter, numerous specific details are set forth in order to provide a thorough understanding of the present subject matter. However, it will be clear to those of ordinary skill in the art that the present subject matter may be practiced without such specific details.

In accordance with various embodiments of the present disclosure, the methods described herein may be implemented using a hardware computer system that executes software programs. Further, in a non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

According to the embodiments, the disclosed technology provides the following advantages, including, but not limited to, distribution-free method, not requiring any assumption on the population distribution, the distribution algorithm is intrinsically parallelizable such that the ECDFs are constructed separately, and the random neighbors are searched independently, the method is unified by ECDFs to work for both continuous and discrete random variables, and performance is guaranteed by large sample analysis. That is, the cloned data have the same statistical properties with the given samples.

The computer-readable non-transitory media includes all types of computer readable media, including magnetic storage media, optical storage media, and solid state storage media and specifically excludes signals. It should be understood that the software can be installed in and sold with the device. Alternatively the software can be obtained and loaded into the device, including obtaining the software via a disc medium or from any manner of network or distribution system, including, for example, from a server owned by the software creator or from a server not owned but used by the software creator. The software can be stored on a server for distribution over the Internet, for example.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

For purposes of this document, each process associated with the disclosed technology may be performed continuously and by one or more computing devices. Each step in a process may be performed by the same or different computing devices as those used in other steps, and each step need not necessarily be performed by a single computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method in a distributed data processing system for generating a data set comprising random numbers that are distributed by a multivariate population distribution, the method empirically determining a representation of operation of the distributed data processing system and comprising:
   constructing, using one or more processors, a set of empirical cumulative distribution functions from a collection of multidimensional random samples of the multivariate population, where each empirical cumulative distribution function is constructed from observations of a random variable;
   sampling, using the one or more processors, a number of multidimensional sample points from the collection of multidimensional random samples; and
   replacing, using the one or more processors, each of the multidimensional sample points with random neighbors to generate cloned data representing operation of the distributed data processing system.

2. The computer-implemented method of claim 1, further comprising generating the random neighbors for elements of one or more of the multidimensional sample points.

3. The computer-implemented method of claim 2, wherein generating the random neighbors for each element of the one or more of the multidimensional sample points comprises:
   sorting distinct observed values of the random variable in an increasing order; and
   generating the random neighbors for a corresponding one of the elements of any one of the multidimensional sample points when the corresponding element is one of between a minimum and a maximum of the observed values, the minimum of the observed values and the maximum of the observed values.

4. The computer-implemented method of claim 3, wherein generating the random neighbor for the corresponding element, further comprises:
   defining a left boundary of the corresponding element as the minimum of one or more nearest left neighbors;
   defining a right boundary of the corresponding element as the maximum of one or more nearest right neighbors;
   generating a first random number that is uniformly distributed over a first interval constructed by the left boundary and the right boundary;
   searching two adjacent observed values such that an empirical cumulative distribution function range for the adjacent observed values covers the first random number;
   defining a second interval by the two adjacent observed values; and
   generating the random neighbor when the corresponding random variable is continuous or discrete.

5. The computer-implemented method of claim 4, wherein generating the random neighbor for the element of the one or more multidimensional random sample points when the corresponding random variable is continuous comprises generating a second random number that is uniformly distributed over the second interval.

6. The computer-implemented method of claim 4, wherein generating the random neighbor for the element of the one or more multidimensional random sample points when the corresponding random variable is discrete comprises defining a second random number to be the right boundary of the second interval.

7. The computer-implemented method of claim 3, wherein generating the random neighbor for the element of the one or more multidimensional random sample points, which is the minimum of the observed values, when the corresponding random variable is continuous, comprises generating a second random number that is uniformly distributed over a third interval from the minimum to another one of the observed values.

8. The computer-implemented method of claim 3, wherein generating the random neighbor for the element of the one or more multidimensional random sample points, which is the maximum of the observed values, when the corresponding random variable is continuous, comprises generating a second random number that is uniformly distributed over a fourth interval from a non-maximum observed value to the maximum.

9. The computer-implemented method of claim 3, wherein generating the random neighbor for the element of the one or more multidimensional random sample points, which is the minimum of the observed values, when the corresponding random variable is discrete, comprises generating a second random number from a predetermined number of the minimum observed values.

10. The computer-implemented method of claim 3, wherein generating the random neighbor for the element of the one or more multidimensional random sample points, which is the maximum of the observed values, when the corresponding random variable is discrete, comprises generating a second random number from a predetermined number of the maximum observed values.

11. The computer-implemented method of claim 1, wherein replacing the number of sample points with random neighbors is performed by one or more processors in parallel.

12. A device for generating random numbers in a distributed data processing system for generating a data set comprising random numbers that are distributed by a multivariate population distribution, the device empirically determining a representation of operation of the distributed data processing system and comprising:
a non-transitory memory storage comprising instructions; and
one or more processors in communication with the memory, wherein the one or more processors execute the instructions to perform operations comprising:
constructing a set of empirical cumulative distribution functions from a collection of multidimensional random samples of the multivariate population, where each empirical cumulative distribution function is constructed from observations of a random variable;
sampling a number of multidimensional sample points from the collection of multidimensional random samples; and
replacing each of the multidimensional sample points with random neighbors to generate cloned data representing operation of the distributed data processing system.

13. The device of claim 12, wherein the one or more processors further execute the instructions to perform operations comprising:
generating the random neighbors for elements of the one or more multidimensional sample points by:
generating the random neighbors for each element of any one of the multidimensional sample points comprises:
sorting distinct observed values of the random variable in an increasing order; and
generating the random neighbors for a corresponding one of the elements of any one of the multidimensional sample points when the corresponding element is one of between a minimum and a maximum of the observed values, the minimum of the observed values and the maximum of the observed values.

14. The device of claim 13, wherein for the generating the random neighbor for the corresponding element, the one or more processors further execute the instructions to perform operations comprising:
defining a left boundary of the corresponding element as the minimum of one or more nearest left neighbors;
defining a right boundary of the corresponding element as the maximum of one or more nearest right neighbors;
generating a first random number that is uniformly distributed over a first interval constructed by the left boundary and the right boundary;
searching two adjacent observed values such that an empirical cumulative distribution function range for the adjacent observed values covers the first random number;
defining a second interval by the two adjacent observed values; and
generating the random neighbor when the corresponding random variable is continuous or discrete.

15. The device of claim 13, wherein for the generating the random neighbor for the element of the one or more multidimensional random sample points, which is the minimum of the observed values, when the corresponding random variable is continuous, the one or more processors execute the instructions to perform operations comprising generating a second random number that is uniformly distributed over a third interval from the minimum to another one of the observed values.

16. The device of claim 13, wherein for the generating the random neighbor for the element of the one or more multidimensional random sample points, which is the maximum of the observed values, when the corresponding random variable is continuous, the one or more processors execute the instructions to perform operations comprising generating a second random number that is uniformly distributed over a fourth interval from a non-maximum observed value to the maximum.

17. The device of claim 13, wherein for the generating the random neighbor for the element of the one or more multidimensional random sample points, which is the minimum of the observed values, when the corresponding random variable is discrete, the one or more processors execute the instructions to perform operations comprising generating a second random number from a predetermined number of the minimum observed values.

18. The device of claim 13, wherein for the generating the random neighbor for the element of the one or more multidimensional random sample points, which is the maximum of the observed values, when the corresponding random variable is discrete, the one or more processors execute the instructions to perform operations comprising generating a second random number from a predetermined number of the maximum observed values.

19. A non-transitory computer-readable medium in a distributed data processing system storing computer instructions for generating a data set comprising random numbers that are distributed by a multivariate population distribution, the computer instructions empirically determining a representation of operation of the distributed data processing system that when executed by one or more processors, perform the steps of:
constructing a set of empirical cumulative distribution functions from a collection of multidimensional random samples of the multivariate population, where each empirical cumulative distribution function is constructed from observations of a random variable;
sampling a number of multidimensional sample points from the collection of multidimensional random samples; and
replacing each of the multidimensional sample points with random neighbors to generate cloned data representing operation of the distributed data processing system.

20. The non-transitory computer-readable medium of claim 19, wherein the one or more processors further perform the steps of:

generating the random neighbors for each element of one or more of the multidimensional sample points comprises:

sorting distinct observed values of the random variable in an increasing order; and generating the random neighbors for a corresponding one of the elements of any one of the multidimensional sample points when the corresponding element is one of between a minimum and a maximum of the observed values, the minimum of the observed values and the maximum of the observed values.

21. The non-transitory computer-readable medium of claim 20, wherein for the generating the random neighbor for the corresponding element, the one or more processors further perform the steps of:

defining a left boundary of the corresponding element as the minimum of one or more nearest left neighbors;

defining a right boundary of the corresponding element as the maximum of one or more nearest right neighbors;

generating a first random number that is uniformly distributed over a first interval constructed by the left boundary and the right boundary;

searching two adjacent observed values such that an empirical cumulative distribution function range for the adjacent observed values covers the first random number;

defining a second interval by the two adjacent observed values; and generating the random neighbor when the corresponding random variable is continuous or discrete.

* * * * *